(12) United States Patent
Bekaert et al.

(10) Patent No.: US 9,230,300 B2
(45) Date of Patent: Jan. 5, 2016

(54) METHOD FOR CREATING A MOSAIC IMAGE USING MASKS

(76) Inventors: Tim Bekaert, Heule (BE); Pawel Kaczanowski, Lódz (PL); Marcin Cuprjak, Lodz (PL)

( * ) Notice: Subject to any disclaimer, the term of this patent is extended or adjusted under 35 U.S.C. 154(b) by 265 days.

(21) Appl. No.: 13/503,420

(22) PCT Filed: Oct. 22, 2009

(86) PCT No.: PCT/EP2009/063940
§ 371 (c)(1),
(2), (4) Date: Jul. 9, 2012

(87) PCT Pub. No.: WO2011/047731
PCT Pub. Date: Apr. 28, 2011

(65) Prior Publication Data
US 2012/0269456 A1    Oct. 25, 2012

(51) Int. Cl.
*G06T 3/40* (2006.01)
(52) U.S. Cl.
CPC .................................. *G06T 3/4038* (2013.01)
(58) Field of Classification Search
None
See application file for complete search history.

(56) References Cited

U.S. PATENT DOCUMENTS

| | | | |
|---|---|---|---|
| 5,991,444 A * | 11/1999 | Burt et al. | 382/232 |
| 2003/0165255 A1 | 9/2003 | Yanagawa et al. | |
| 2005/0031169 A1 | 2/2005 | Shulman et al. | |
| 2005/0063608 A1 * | 3/2005 | Clarke et al. | 382/284 |
| 2005/0270500 A1 | 12/2005 | Ito | |
| 2007/0237422 A1 * | 10/2007 | Zhou et al. | 382/284 |
| 2008/0143820 A1 | 6/2008 | Peterson | |
| 2010/0086174 A1 * | 4/2010 | Kmiecik | G06K 9/00798 382/103 |
| 2010/0118116 A1 * | 5/2010 | Tomasz et al. | 348/36 |

FOREIGN PATENT DOCUMENTS

| | | |
|---|---|---|
| EP | 1 077 161 A2 | 2/2001 |
| EP | 1 830 321 A2 | 9/2007 |
| WO | 20080130219 A1 | 10/2008 |
| WO | WO 2008/150153 A1 * | 11/2008 ............. G06T 15/10 |

OTHER PUBLICATIONS

Zhang D et al "Segmentation of moving objects in image sequence: A review" Circuits,Systems & Signal Processing, Birkhauser-Verlag, BO LNKD—Jan. 1, 2001 XP002531842.
Gi-Hong Kim et al "Road Infrastructure Data Acquisition Using a vehicle-Based Mobile Mapping System" Computer-Aided Civil and Infrastructure Engineering, Blackwell Publishers, Malden,US LNKD—Jul. 1, 2006 XP002434071.

(Continued)

*Primary Examiner* — Vu Le
*Assistant Examiner* — Alexander J Lesnick

(57) ABSTRACT

Photographic images recorded with mobile mapping vehicles (20) in real life situations usually contain cars or other moving objects (34) that cover visual information on the road surface (24). According to the techniques of this invention, moving objects (34) are detected by grayscale differencing in overlapping pixels or sections of two or more orthorectified image tiles. Based on moving object identification, masks are generated for each orthorectified tile. The masks are then compared and priorities established based on grayscale values associated with the masks. Mosaics of a large surface of interest such as the Earth can be assembled from a plurality of overlapping photographic images with moving objects (34) largely removed from the resulting mosaic.

6 Claims, 12 Drawing Sheets

(56) References Cited

OTHER PUBLICATIONS

International Search report issued Aug. 4, 2010 for International Application No. PCT/EP2009/063940.
Bertozzi M et al: "Obstacle detection for start-inhibit and low speed driving" Intelligent Vehicles Symposium, 2005. Proceedings. IEEE Las Vegas, NV, USA Jun. 6-8, 2005, Piscataway, NJ, USA,IEEE, Piscataway, NJ, USA LNKD DOI: 10.1109/IVS.2005.1505164, Jun. 6, 2005, XPOI0833856.
Jayaramamurthy S N et al: "An approach to the segmentation of textured dynamic scenes" Computer Vision, Graphics, and Image Processing, Elsevier Science, vol. 21, No. 2, Feb. 1, 1983, pp. 239-261, XP009136338.
International Search report issued Jul. 28, 2010 for International Application No. PCT/EP2009/063941.

* cited by examiner

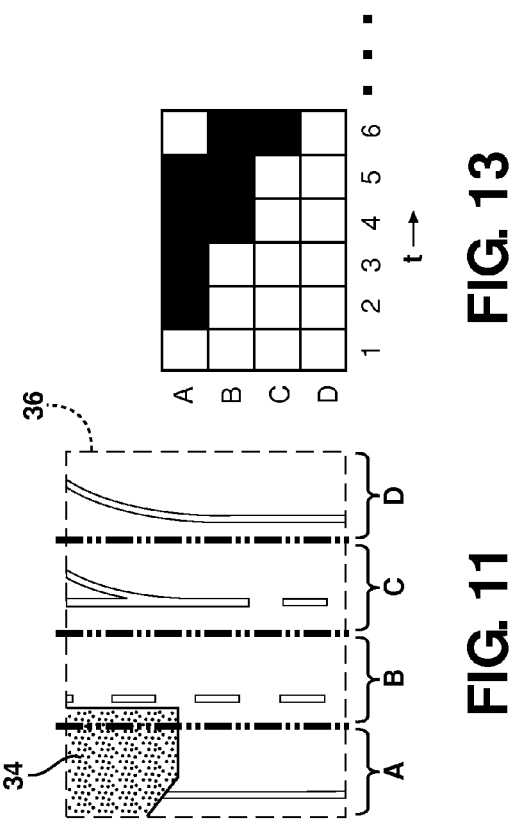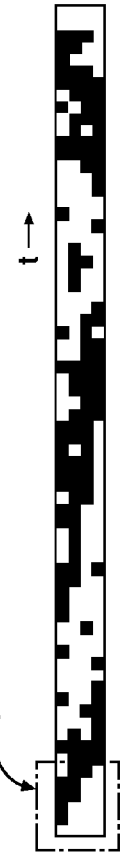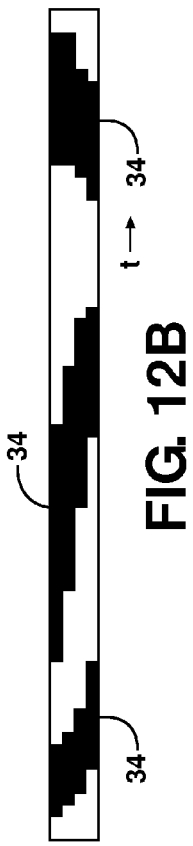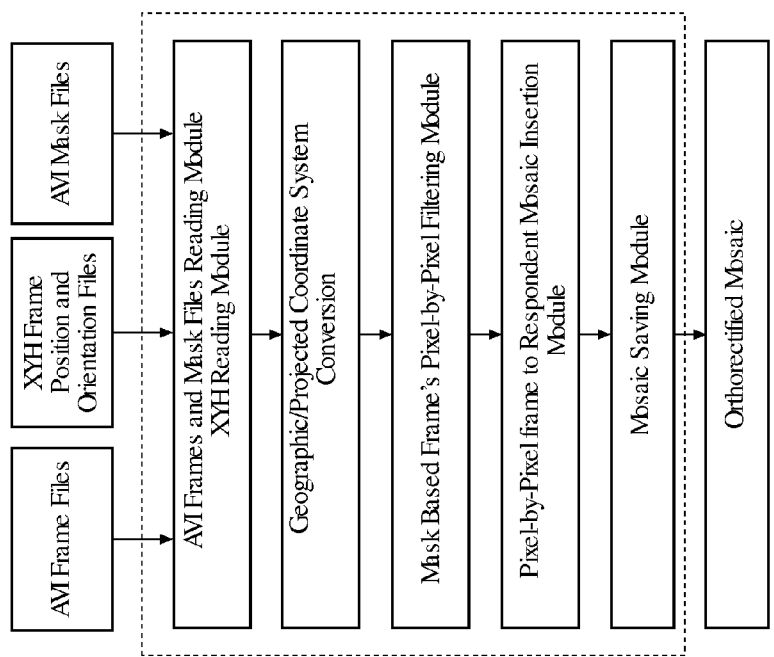

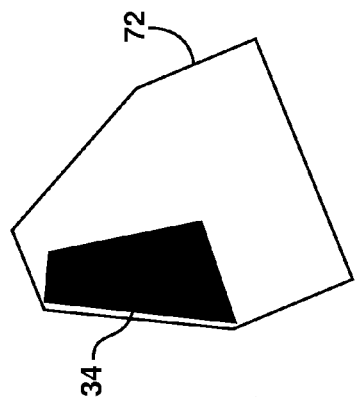
FIG. 16A
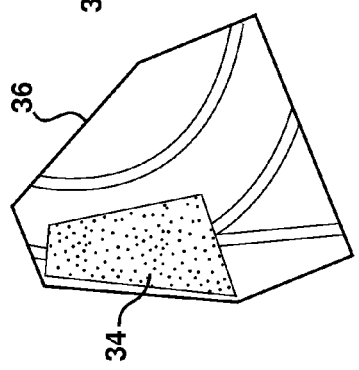
FIG. 16B
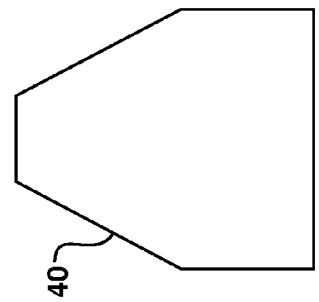
FIG. 17A
FIG. 17B
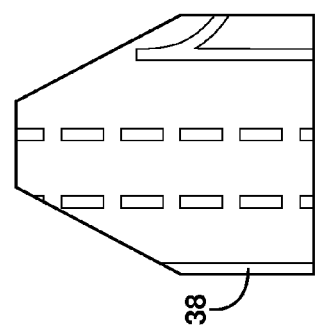
FIG. 18A
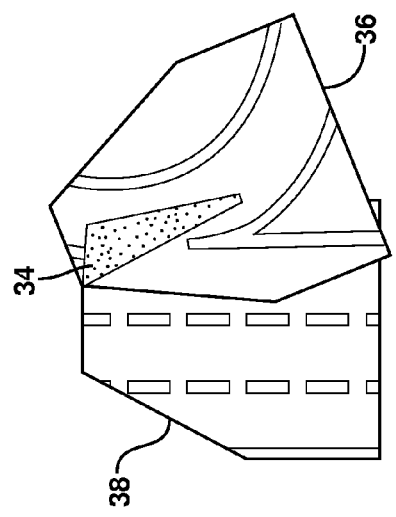
FIG. 18B
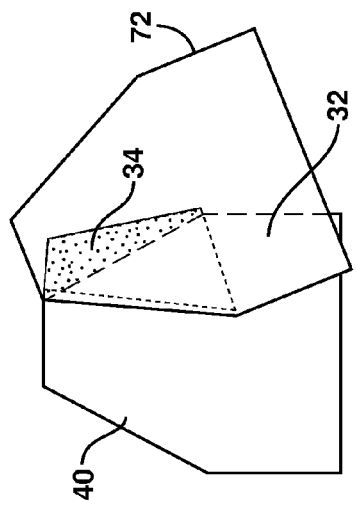
FIG. 18C
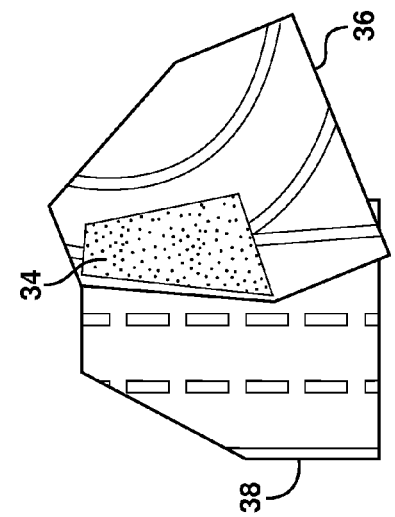

METHOD FOR CREATING A MOSAIC IMAGE USING MASKS

CROSS-REFERENCES TO RELATED APPLICATIONS

This application is the National Stage of International Application No. PCT/EP2009/063940, filed Oct. 22, 2009 and designating the United States. The entire content of this application is incorporated herein by reference.

BACKGROUND OF THE INVENTION

1. Field of the Invention

The present invention relates to a method for creating a mosaic made up of a plurality of small overlapping photographic images wherein obstructions due to moving foreground objects are minimized.

2. Related Art

Digital maps and digital map databases are used in navigation systems. Digital maps are obtained by various methods, including high resolution imagery from space, as well as orthorectified images taken from land-based mobile vehicles. In the latter case, the images obtained from land-based mapping systems must be converted to an orthorectified image which is scale-corrected and depicts ground features as seen from above in their exact ground positions. An orthorectified image is a kind of aerial photograph that has been geometrically corrected such that the scale of the photograph is uniform, meaning that the photograph can be considered equivalent to a map. An orthorectified image can be used to measure true distances, because it is an accurate representation of the surface of interest, e.g., the Earth's surface. Orthorectified images are adjusted for topographic relief, lens distortion and camera tilt.

Orthorectified images can be obtained very efficiently from aerial images. However, errors are often introduced, which can result in inaccurate mapping of the geo-positioned data. One problem is that normally aerial images are not taken exactly perpendicular to the surface of the Earth. Even when a picture is taken close to perpendicular, only its exact center line will be perpendicular. In order to orthorectify such an image, height of terrain information must be additionally obtained. The lack of accurate height information of objects in an aerial image, in combination with the triangulation process used to determine the orthorectified image, can result in an inaccuracy of such images up to a dozen meters or more. The accuracy can be improved by taking overlapping images and comparing the same surface obtained from subsequent images. However, there is a limit to the accuracy obtained from this method as compared to its cost.

Herein, the term "horizontal" data or information corresponds to objects that have a surface parallel or substantially parallel to the Earth's surface. The term "vertical" data or information corresponds to objects that can be seen with a looking axis generally parallel to the Earth's surface. Vertical information cannot be obtained from a typical look-down aerial or satellite image.

Mobile mapping vehicles, typically terrestrial based vehicles such as a van or car, but possibly also aerial vehicles, are used to collect mobile data for enhancement of digital map databases. The mobile mapping vehicles are typically fitted with a number of cameras, possibly some of them stereographic and all of them accurately geo-positioned as a result of having precision GPS and other position and orientation determination equipment (e.g., inertial navigation system—INS) on board. While driving the road network or an established course, the geo-coded image sequences are captured in successive frames or images. Geo-coded means that a position, computed by the GPS receiver and possibly INS, and possibly additional heading and/or orientation data associated with the image, is attached to the metadata of each image captured by the camera. The mobile mapping vehicles record more than one image sequence of the surface of interest, e.g., a road surface, and for each image of an image sequence, the geo-position in a geographic coordinate reference system is accurately determined together with the position and orientation data of the image sequence with respect to the geo-position. Image sequences with corresponding geo-position information are referred to as geo-coded image sequences. Other data may also be collected by other sensors, simultaneously and similarly geo-coded.

Prior techniques for obtaining orthorectified tiles for use in assembling a bird's eye mosaic (BEM) of a large surface of interest, such as the Earth, are known. An excellent example of this technique is described in the Applicant's International Publication No. WO/2008/044927, published Jul. 17, 2008. In jurisdictions where incorporation by reference is recognized, the entire disclosure of the said International Publication is hereby incorporated by reference and relied upon.

According to known techniques, orthorectified images are assembled together to create a mosaic without considering the quality of the image content contained therein. Rather, such images are typically tiled in sequence, one after the other, much like shingles are overlapped one upon another in courses on a roof. While generally effective, it is often the case that moving objects captured in the photograph images, e.g., motor vehicles that are passing or being passed by the mobile mapping vehicle, appear in an overlaying tile but not an underlaying tile, such that a less desirable tile is overlaid upon a more desirable tile. As a result, a moving foreground object that partially obscures the map of the road surface may appear on the completed BEM.

The Applicant's copending application P6015247 PCT, titled Method Of An Apparatus For Producing A Multi-Viewpoint Panorama, describes a method to generate vertical panoramas using a sequence of vertical images taken from multiple viewpoints from a mobile mapping vehicle. While creating a panorama, objects close to the camera are detected using laser scanner data. Objectionable objects captured in the image are removed by marking the parts in the vertical images that should not be used. The parts that should be used are then projected onto the panorama surface.

The use of laser data, particularly in connection with vertical images, is an expensive, cumbersome and less desirable technique for creating orthorectified horizontal images for use in creating a bird's eye mosaic (BEM). According, there is a need for identifying moving foreground objects in an orthorectified photographic image of a surface of interest which does not rely upon the use of laser scanners or other cumbersome techniques, particularly when existing image data may be available without contemporaneous laser scanning data.

SUMMARY OF THE INVENTION

According to this invention, a method is provided for creating a mosaic of a large surface of interest such as the Earth from a plurality of small overlapping photographic images. The method comprises the steps of providing a first tile from a first orthorectified photograph of the surface of interest. The first photograph having been taken with a camera at a first distance. The first tile is divided into discrete sections and associated with an absolute coordinate location and orientation relative to the surface of interest. A first mask is provided for the first tile in which any known moving foreground objects are assigned a high priority grayscale value and all other areas in the first tile are assigned a low priority grayscale value. The first mask is divided into discrete sections corresponding to the sections of the first tile. A second tile is provided from a second orthorectified photograph of the surface of interest that at least partly overlaps the first tile. The second photograph having been taking with a camera at a second distance. The second tile is divided into discrete sections and associated with an absolute coordinate location and orientation relative to the surface of interest. A second mask is created for the second tile in which any known moving foreground objects are assigned high priority grayscale values and all other areas in the second tile are assigned a low priority grayscale value. The second mask is divided into discrete sections corresponding to the sections of the second tile. Coincident sections in the first and second tiles, i.e., sections that are associated with the same absolute coordinate location relative to the surface of interest, are compared. The invention is characterized by replacing the coincident section in the first tile with the coincident section from the second tile if the grayscale value of the corresponding section in the second mask has a higher priority than the grayscale value in the corresponding section of the first mask. In other words, moving foreground objects, which are undesirable in a mosaic, are removed by marking the parts in the orthorectified images by use of the supplemental masks. The supplemental masks allow priorities to be established between two or more tiles, which enable the image with the highest priority to be used in the mosaic, where images having lower priority values are discarded. Accordingly, a mosaic of a large surface of interest, such as the Earth, can be generated with greater precision and efficiency than available using prior art techniques.

BRIEF DESCRIPTION OF THE DRAWINGS

FIG. 10 is a flow diagram describing the creation of a mosaic using the methods of this invention;

FIG. 11 represents an orthorectified tile like that of FIG. 5 subdivided into four columns (A-D) for purposes of post-processing image refinement;

FIG. 12A is a time graph of the raw data collected from the subject invention, with rows representing the subdivided sections (A-D) in each tile and columns representing sequential tiles or images (t−Δt, t, t+Δt, etc);

FIG. 12B is the time graph of FIG. 12A illustrating the manner in which behavior modeling can be used to improve the detection of foreground moving objects;

FIG. 13 is an enlarged view of the region circumscribed at 13 in FIG. 12A;

FIG. 16A depicts a first tile as captured by a first camera directed forwardly of the mobile mapping vehicle in FIG. 15;

FIG. 16B is a mask generated for the first tile of FIG. 16A;

FIG. 17A is an orthorectified second tile as taken from the second camera facing angularly from the mobile mapping vehicle in FIG. 15;

FIG. 17B represents a second mask generated for the second tile of FIG. 17A;

FIG. 18A represents a tiling of the first and second tiles wherein the overlapping second tile obscures a portion of the visible road surface due to a moving foreground obstruction;

FIG. 18B depicts a comparison between the first and second masks, wherein mask priorities are assessed and used to determine which portions of the first and second tiles contain more accurate data of the surface of interest;

FIG. 18C is a view as in 18A, however showing the creation of a mosaic with improved data by way of the mask comparisons.

DETAILED DESCRIPTION OF THE PREFERRED EMBODIMENT

Figure 1:
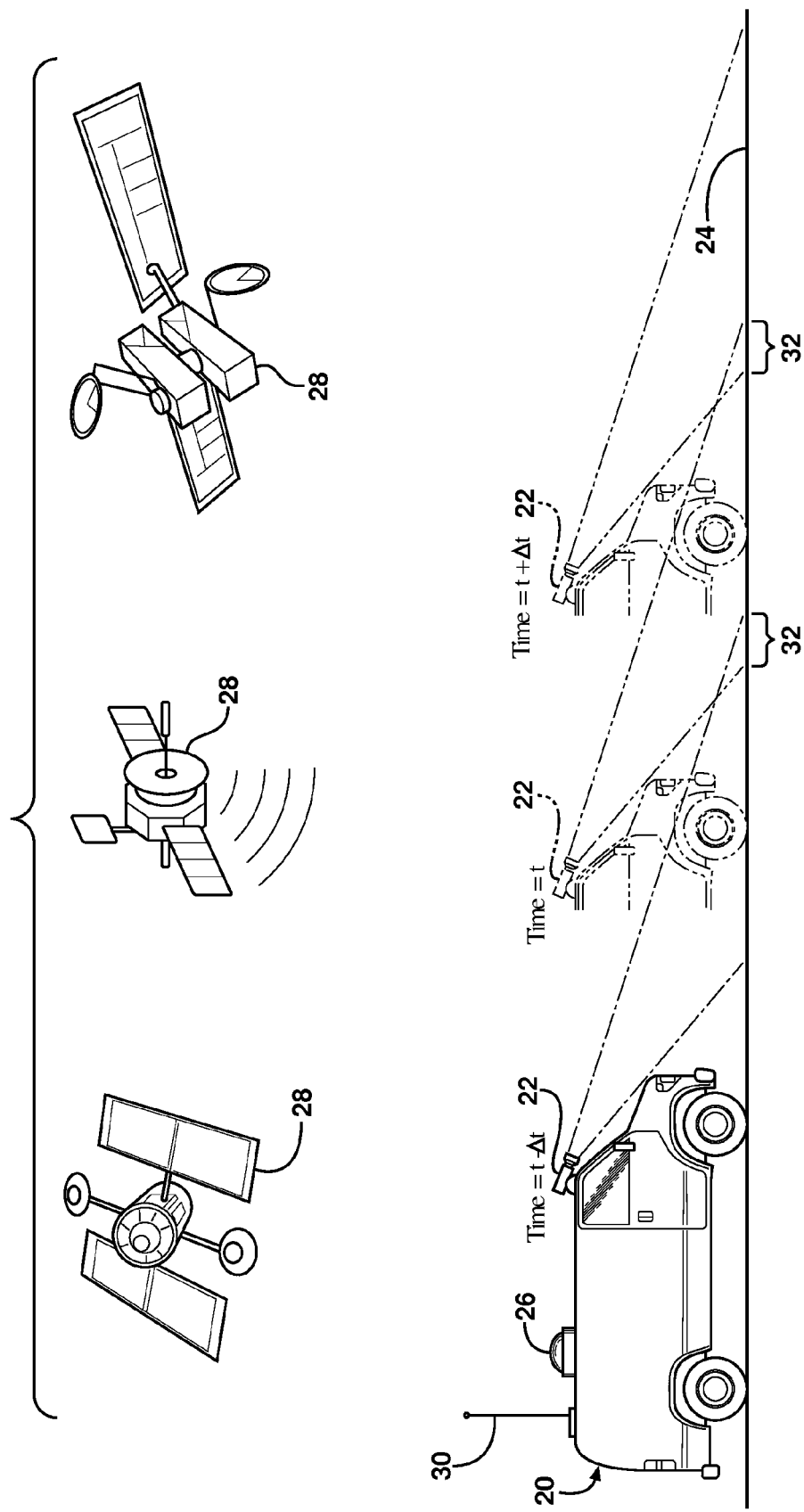
FIG. 1 is a highly simplified illustration of a mobile mapping vehicle traversing a road surface and taking a series of sequential images using appropriate photographic equipment that is geo-coded using GPS positioned data together with orientation data acquired from appropriate telemetric equipment.

Referring to the figures, wherein like numerals indicate like or corresponding parts throughout the several views, a mobile mapping vehicle is generally indicated at 20. The mobile mapping vehicle 20 is preferably, but not necessarily, a land based van or automobile fitted with one or more cameras 22 of the type commonly used in geographic mapping applications. The camera 22 is highly calibrated so that pictures taken of a surface of interest 24, such as a roadway, can be geo-coded with a specific location and orientation. This is accomplished, typically, through a GPS receiver 26 which receives positional data from a plurality of satellites 28 orbiting the Earth. Furthermore, orientation determination equipment, e.g., INS, is represented by feature 30 to provide heading data for each image taken by the camera(s) 22. With these devices, each photographic image taken by a camera 22 is geo-coded, meaning that its position, as computed by the GPS receiver 26 and orientation equipment 30, along with possibly other heading information, is associated with the image as metadata. As the mobile mapping vehicle 20 traverses the road surface 24, successive images of the road surface 24 are captured at times t−Δt, t and t+Δt with Δt being the time spacing between successive images. The Δt is established sufficiently small so that successive images of the surface 24 overlap one another at regions 32.

Figure 2A:
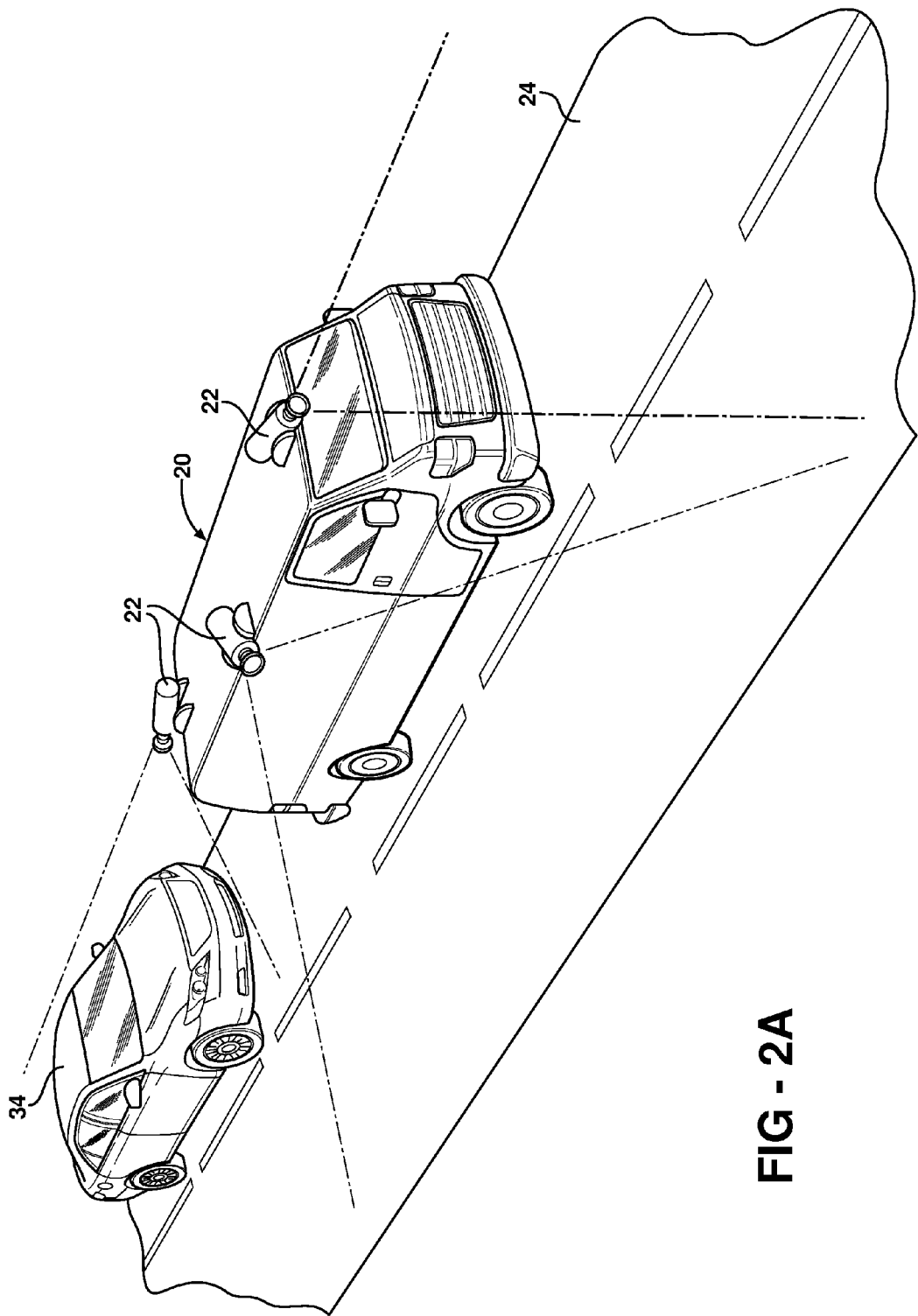
FIGS. 2A-2C illustrate a time sequence view wherein a mobile mapping vehicle according to this invention is overtaken by a foreground moving object, which in this case is depicted as a sports car.
Figure 2B:
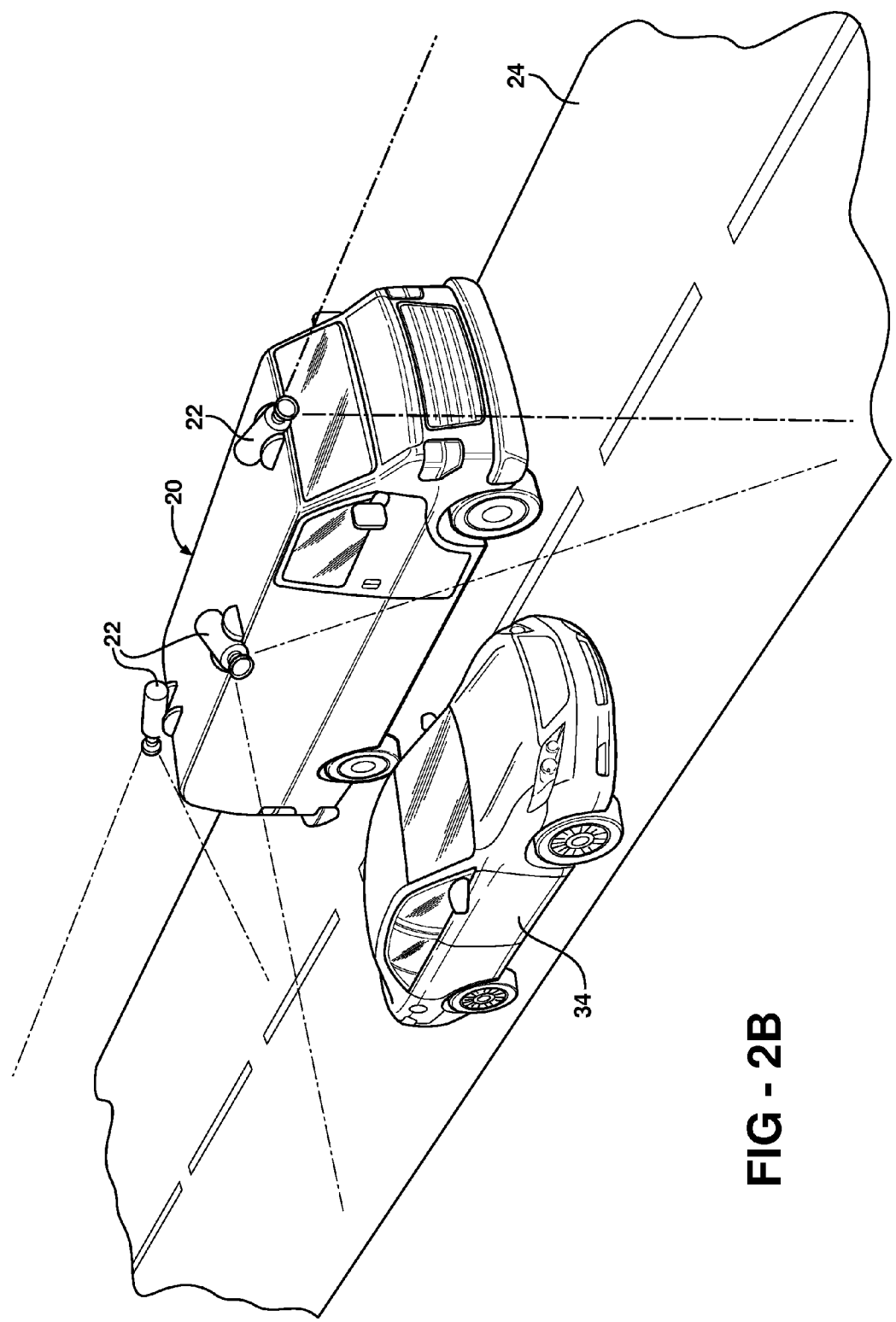
Figure 2C:
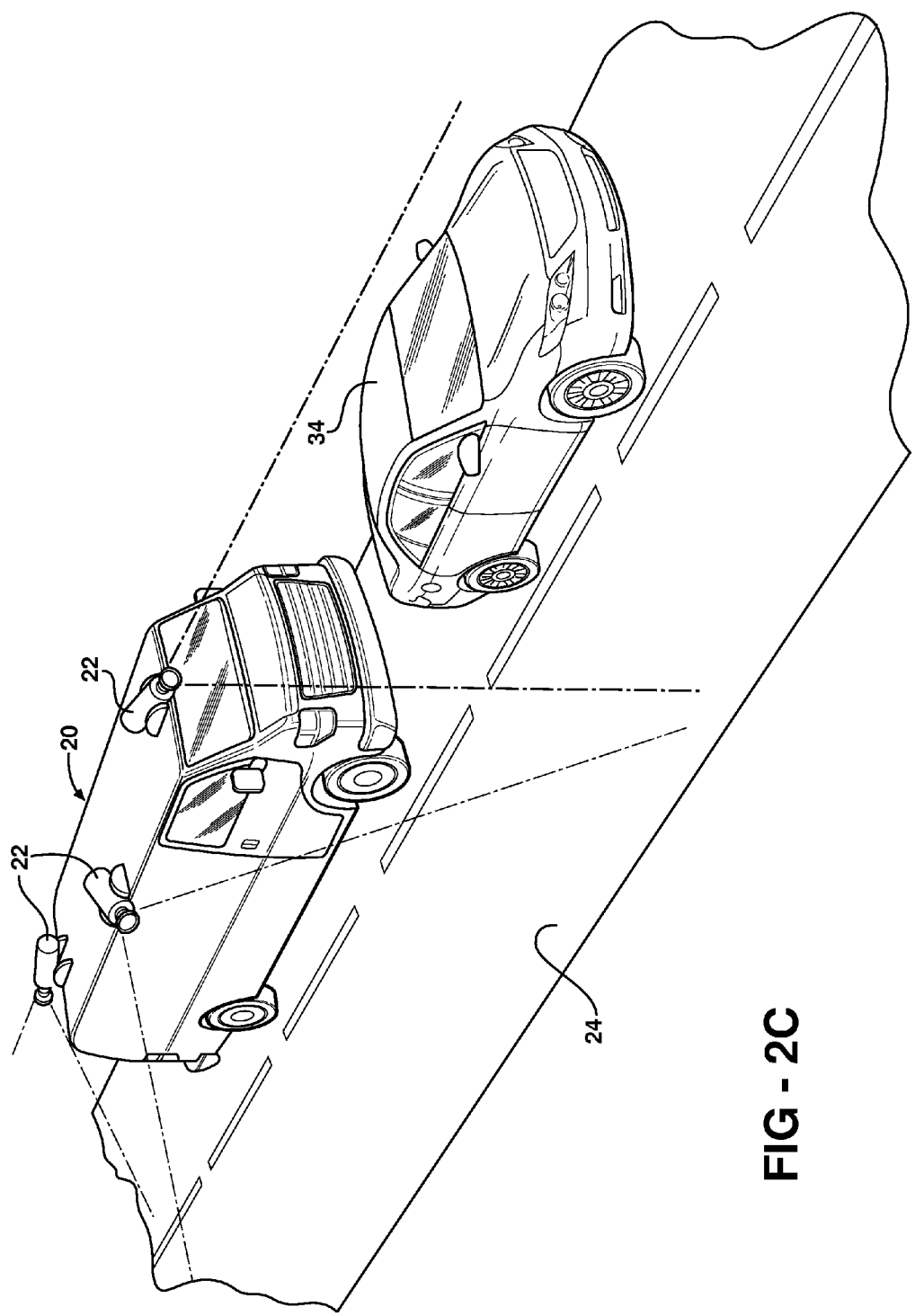

As shown in FIGS. 2A-2C, multiple cameras 22 can be used in connection with the mobile mapping vehicle 20 so as to record photographic images of the surface 24 over a wide range and from different perspectives. During the course of photographing the surface of interest 24, moving foreground objects 34, such as the sports car illustrated in FIGS. 2A-2C, may temporarily obstruct the image of the surface 24 at various times with respect to various cameras 22. Obscured images are particularly troublesome when they occur over lane mergers, intersections, and other relevant roadway features, due to the importance of these features in map making applications.

Figure 3:
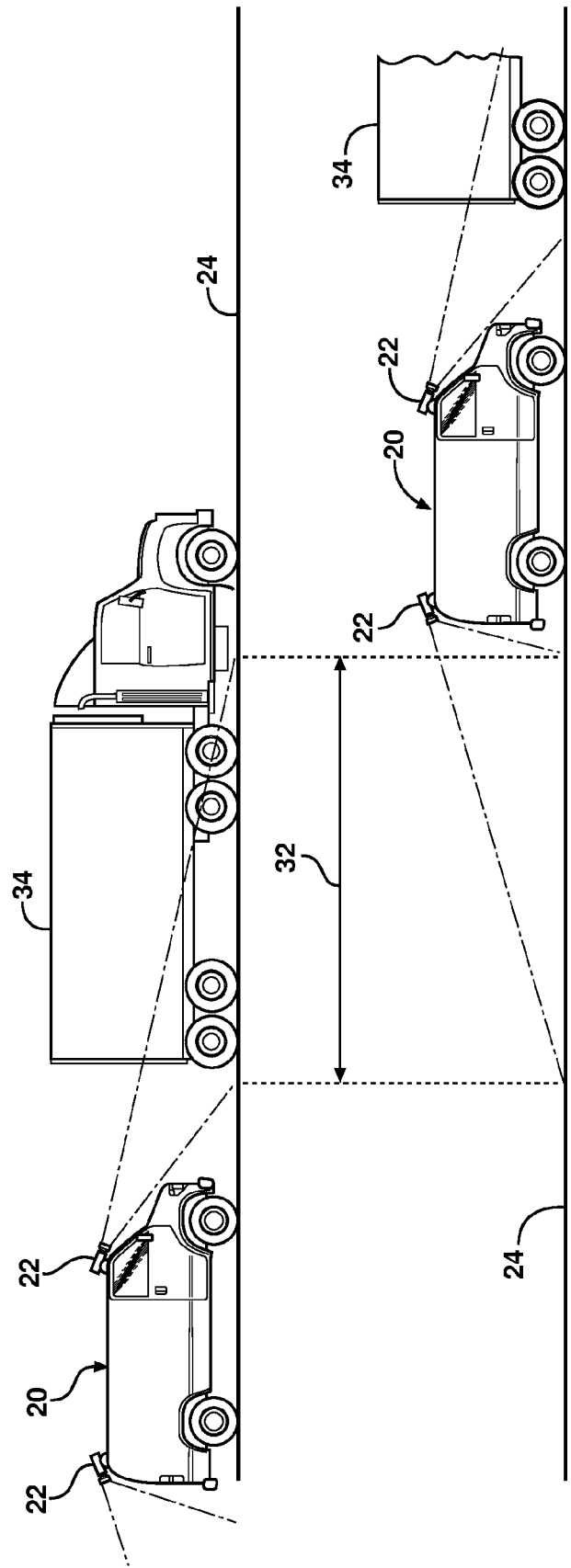
FIG. 3 is a time-lapsed sequence showing the mobile mapping vehicle following a moving foreground obstruction which partially obscures the image of the desired road surface taken with one (forwardly facing) camera, but not with an image of the same surface taken with a different (rearwardly facing) camera.

FIG. 3 illustrates another example wherein a mobile mapping vehicle 20 encounters a moving foreground object 34. In this example, forward facing and rearward facing cameras 22 photograph the same overlapping region 32 at different times. The overlapping region 32 is only obstructed by the moving object 34 in one instance but not another. When assembling a mosaic (e.g., a BEM) from a plurality of small, overlapping photographic images, it is desirable to use the best quality image in each instance. In situations where the same region 32 of the surface of interest 24 is photographed more than once, as in FIG. 3, this invention describes a method by which a moving foreground object, and can be identified within an image, by which the better quality image is used in creating the mosaic.

Figure 4:
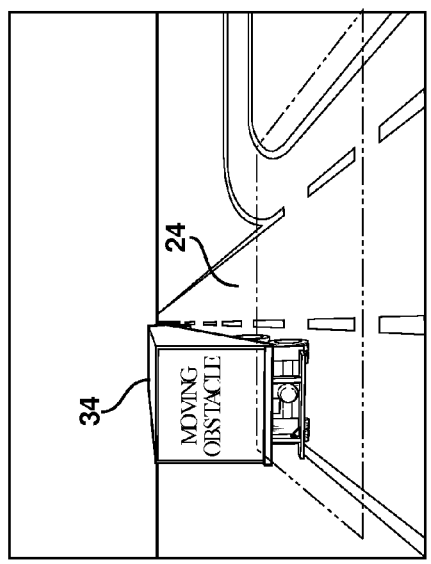
FIG. 4 is a simplified perspective view as seen from the forward facing camera atop a mobile mapping vehicle such as that depicted in FIG. 3, with a moving foreground obstacle appearing in the left lane ahead, and the broken lines representing the boundaries of a photographic image taken by the forward facing camera.

FIG. 4 illustrates a view looking forwardly from the mobile mapping vehicle 20 as depicted in FIG. 3. The trapezoidal broken lines represents the boundary of a photograph taken by the forward facing camera 22 upon the surface of interest 24. A foreground moving object 34 is captured in the upper left quadrant of the image.

Figure 5:
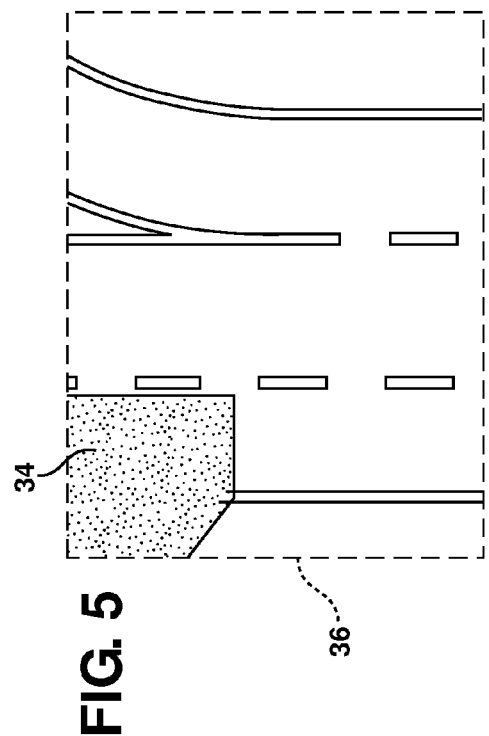
FIG. 5 represents an orthorectified view of the photographic image from FIG. 4, with the obstacle shown as a darkened portion in the upper left corner partially obscuring the view of the road surface.

FIG. 5 shows the photograph after it has been orthorectified using one of the techniques described above. The orthorectified image is referred to as a tile, and in this particular instance a "second" tile 36 although that term is somewhat arbitrary. Thus, for any given moment t, the orthorectified image corresponding to t is placed in a reference coordinate system as per the geo-coded data embedded therewith. The orthorectified images corresponding to t−Δt (first tile) and t+Δt (third tile) are placed in the same coordinate system so overlapping parts between images can be found. This is depicted graphically in FIG. 1.

Figure 6:
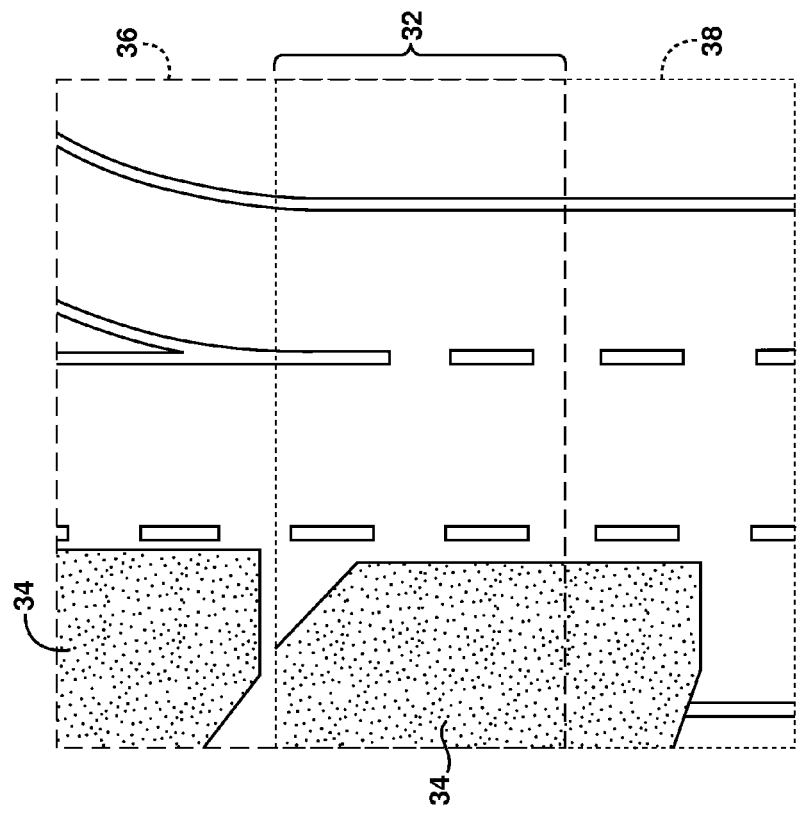
FIG. 6 is an overlay of the tile depicted in FIG. 5, together with a preceding first tile (t−Δt) arranged to show the manner in which the moving foreground obstruction may shift relative positions from one tile to the next and may create view obstructions in one tile but not in another.

With reference again specifically to FIG. 5, it is not known at this phase which sections in the second tile 36 denote moving objects, and which part of the image relates to the surface of interest 24. For the sake of clarity, the term "sections" here is used to describe a defined portion or region of overall tile. In practice, a section will be assigned for each pixel in a digital photograph, however resolution to that fine scale is not always necessary. FIG. 6 shows the second tile 36 of FIG. 5, together with an overlapping part 32 of a "first" tile 38. The first tile 38 represents a photographic image taken by the camera 22 at time t−Δt, or immediately prior to that of the taking of the photographic image that resulted in the orthorectified second tile 36. As will be described subsequently, it is possible that the first 38 and second 36 tiles are taken simultaneously by two different cameras 22, or taken at two different times by two different cameras as suggested in FIG. 3.

When the tiles 36, 38 are overlapped in the manner shown in FIG. 6, the non-moving surface of interest 24 appears substantially identical, such that the images can be overlapped with little to no distortion. This is evident by the perfectly aligned lane markings in the overlapping region 32. However, moving objects 34 have different positions at time t−Δt and time t and therefore can be seen at different positions along the road surface 24 in the overlapping parts of the along-the-road orthorectified tiles 36, 38. The overlapping region 32 may also be referred to as the coincident section 32, meaning that these respective sections (or pixels) in the tiles 36, 38 are associated with the same absolute coordinate location relative to the surface of interest 24.

Figure 9:
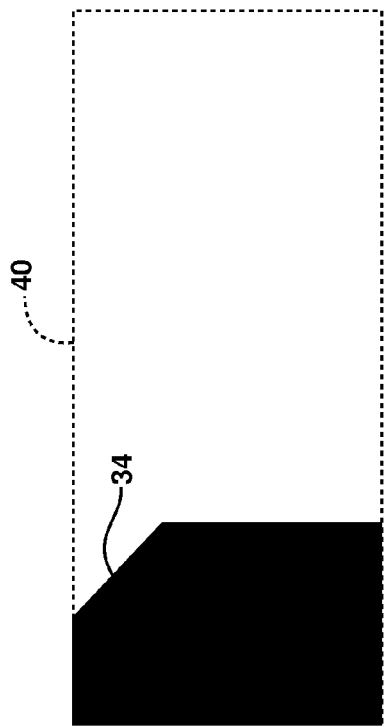
FIG. 9 depicts a mask for the coincident section of the first tile (FIG. 8)
Figure 7:
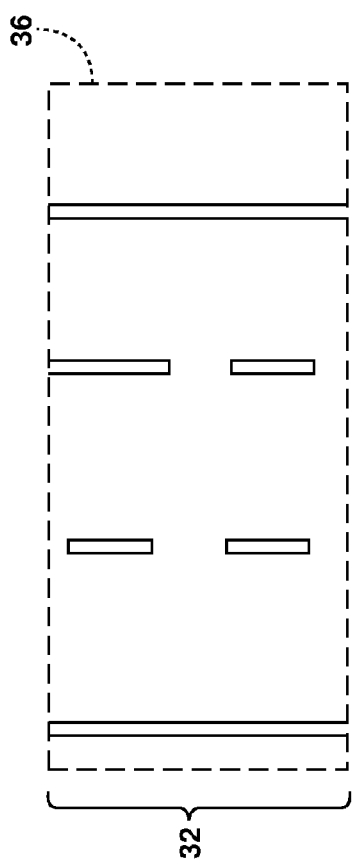
FIG. 7 depicts the coincident section of the second tile as shown in FIG. 5.
Figure 8:
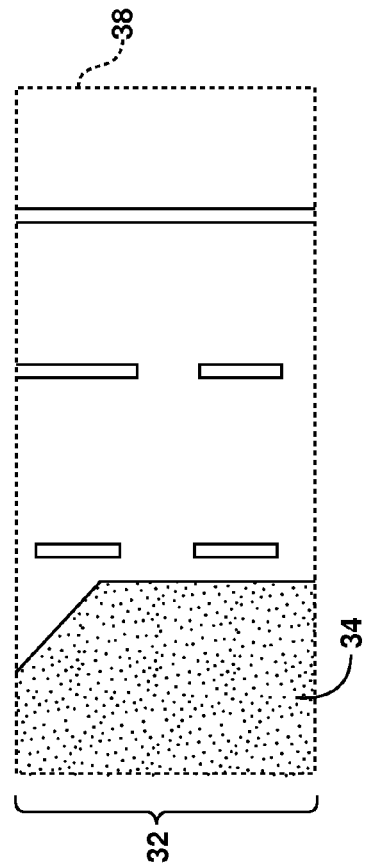
FIG. 8 is a view of the coincident section from the first tile of FIG. 6, wherein the moving obstruction is shown blocking a portion of the road surface.

FIGS. 7 and 8 depict the coincident section 32 of the second 36 and first 38 tiles, respectively. That is, FIG. 7 is a fractional view of the second tile 36 showing only its portion of the coincident section 32. FIG. 8, on the other hand, is a fractional view from the first tile 38 showing its portion of the same coincident section 32. In comparing the coincident sections 32 from the first 38 and second 36 tiles, it is apparent that the road surface 24 is unobstructed in FIG. 7, whereas in FIG. 8 a portion of the road surface is obstructed by the moving object 34. By comparing the overlapping parts of the tiles 38, 36 it is possible to determine if an object in motion 34 is present. This is done by calculating, region-by-region or pixel-by-pixel, the absolute difference in grayscale values. These are then thresholded to obtain a black/white image called a mask 40 as depicted in FIG. 9. Whether done on a pixel-by-pixel or more coarse regional analysis, the grayscale value is determined across the entire coincident section 32 for each of the first 38 and second 36 tiles.

Grayscale values commonly range between 0 and 255, with 0 equating to black and 255 equating to white. In a color photograph, the grayscale value can be calculated by simply averaging the individual red, green and blue color values for each section or pixel. Thus, according to a simple averaging technique, if the red color value is 155, the blue color value is 14 and the green color value is 90, then the grayscale color value is approximately 86. In practice, however, the grayscale value is often calculated as a weighted sum. For example: 0.2989×R+0.5870×G+0.1140×B. Of course, other grayscale determination techniques may also be used. An appropriate threshold value is predetermined between the numbers of 0 and 255. For example, a threshold value may be selected as 60. In this case, if the absolute difference, i.e., absolute value of the difference, between the grayscale values in the pixels or regions of the coincident sections in the first 38 and second 36 tiles exceeds the threshold value, e.g., 60, then a moving foreground object 34 is identified as present in that pixel or region. As an example, if the grayscale value for the particular pixel or region within the coincident section 32 in the first tile 38 is 86, and the grayscale value in the corresponding pixel or region of the second tile 36 is 15, then the absolute difference between grayscale values equals 86 minus 15 or 71. The difference 71 is above the exemplary threshold value of 60 and therefore it is concluded that a moving foreground object 34 is depicted or captured in that particular pixel or region of the coincident section 32.

By comparing two tiles 36, 38 in this manner, the mask 40, which may be referred to as a first mask 40 because it is associated with the first tile 38, can be created. The first mask 40 assigns a white grayscale value, i.e., 255, to the corresponding pixel or region in the first mask 40 when the absolute difference in grayscale values between the first 38 and second 36 tiles is below the predetermined threshold value. However, when the calculation of absolute difference yields a number above the predetermined threshold value, such that a moving foreground object 34 is identified to be present in that pixel or region of the second tile 36, the corresponding pixel or region of the mask 40 is assigned a black grayscale value, i.e., 0, as represented by the black areas in FIG. 9. So, in the example mentioned above, wherein the absolute difference in grayscale value was 71, that particular pixel or region in the mask 40 will be assigned a black grayscale value or appear black as shown in FIG. 9. By this method, the mask 40 clearly identifies the pixels or regions in which the moving foreground object 34 is depicted.

Of course, these "white" and "black" conventions could be easily reversed by assigning 255 instead of 0 to a pixel when the absolute difference between two corresponding pixels (or regions) exceeds the threshold. An altogether different way to explain this feature of the invention avoids the potentially complicated uses of terms "white" and "black," and instead focuses simply on pixel priorities or importances. In this case, pixel (or region) priorities can be assessed strictly on the basis of grayscale value comparisons. Absolute difference comparisons on the side of the threshold value setting (suggested for discussion purposes only as "60" in an earlier example) are given higher priority that those comparisons which fall on the opposite side of the threshold value. Thus, in one approach lower values (i.e., below the threshold value) mean more important pixels whereas in another approach higher values mean more important pixels. This is merely another way to explain the use and implementation of mask values.

Alternatively, rather than assigning the corresponding pixel or region of the mask 40 a black 0 (or white 255) grayscale value, it may be preferable to assign some intermediate grayscale value to the corresponding pixel or region in the mask 40, which may be equivalent to the grayscale value calculated in the coincident section 32 of the first mask 38. In other words, if the corresponding pixel or region in the coincident section 32 in the first mask 38 has a grayscale value of 71, and the calculation of absolute difference exceeds the predetermined threshold value, then the corresponding region or pixel in the mask 40 will be given an intermediate grayscale value of 71. This is an alternative method to that described above and shown in FIG. 9, such that the mask 40 would display grayscale values between the threshold value (e.g., 60) and 0 (or 255 if the white-black convention is reversed as described earlier). In any instance, it is important to note that a mask 40 is created by the comparison of two tiles 36, 38, with moving foreground objects 34 being identified by calculating the absolute difference in grayscale values of corresponding pixels or regions in the coincident section 32.

FIG. 10 provides an overview of the method steps using functional modules such as may be used in a practical application employing a computer processor programmed with enabling software. In simplified fashion, a process flow is shown for creating a mosaic using masks. According to this technique, orthorectified images of a road 24 are collected, having been recorded with calibrated vision equipment 22 mounted on a mobile mapping vehicle 20. Positional data corresponding with the orthorectified tiles are embedded with each image. Masks are then created by comparing overlapping tiles, thereby providing information about the quality of every region or pixel of the coincident section 32 in an orthorectified tile. These masks can be used to then create a mosaic of a very large surface of interest 24, such as the surface of the Earth.

In this manner, masks are created for each orthorectified tile by comparing overlapping orthorectified images. As described more fully below, however, certain modeling or prediction techniques can be used to predict when a moving object 34 will be in particular tile images, and then create masks only for those tiles. The detection of moving objects 34 can be enhanced or refined by comparing a sequence of masks, as perhaps best shown in FIGS. 11 through 13. For example, FIG. 11 depicts the orthorectified second tile 36 as shown in FIG. 5. In order to improve the raw detection results, the behavior of moving objects 34 can be modeled. Moving objects 34 generally fall into two classes: objects at substantially constant velocity relative to the mobile mapping vehicle 20, and moving objects 34 that are overtaking or being overtaken by the mobile mapping vehicle 20. While objects 34 in the first class riding in front of the mobile mapping vehicle 20 do indeed become visible in the top part of the tiled images, they also disappear from visibility in the same part of the image. These objects 34 are not a practical difficulty because, as successive tiles are overlapped one upon another to create the resulting mosaic, they become "tiled away" and are almost always invisible in the final mosaic because the next tile not containing the object is drawn over it, much like roof tiles. Therefore, objects 34 in the second class (overtaking) tend to pose larger difficulties. These objects 34 tend to appear in the resulting mosaic (BEM) or tiles are almost always driving in a different lane than the mobile mapping vehicle 20, due to the very nature of overtaking cars (see FIGS. 2A-2C for illustration).

FIG. 12A depicts the raw detection data showing mask data in four different regions (A, B, C, D) of the orthorectified images or tiles over time t. Thus, along the horizontal axis, the numbers 1, 2, 3 . . . in FIG. 13 represent time or frame numbers for a particular camera 22. The vertical axis represents the masks regioned A-D in the horizontal direction, as per FIG. 11. The black in the top part of an image here means that there is an object 34 present in the left of the tile (see FIG. 11). Black in the bottom part of an image means that an object 34 was detected during the first step (FIG. 6) of the mask generation, which detected raw moving obstacles 34. Thus, in referring specifically to FIGS. 12A, 12B and 13, the horizontal frames are divided into four vertical regions A-D. One region is either entirely black or entirely white. The value (0 for black and 255 for white) is chosen by thresholding the total number of pixels in that region (A-D) having a particular value after the raw obstacle detection is completed. Thus, in order to improve robustness, the data is adjusted, based on the modeled behavior of the object 34 moving through the frames. The result is the data as illustrated in FIG. 12B, which, over time, more clearly depicts an object 34 rather quickly overtaking the mobile mapping vehicle 20 in the first fifteen frames, and then a much slower moving object 34 overtaking the mobile mapping vehicle 20 over frames fifteen through about fifty. The next ten frames (about) contain no detected moving objects, however frames seventy through eighty-five (about) show the mobile mapping vehicle 20 overtaking a moving object 34.

Each mask can be described as a set of data indicating which regions or pixels in an orthorectified image, i.e., a tile, contain an object in motion 34. The preceding example illustrated by FIGS. 12A and 12B describes the refining of detection data to yield better results. These steps are not performed for every component of the vision system, but only for a certain subset. For that subset, the mask data is readily available as output of the previous steps. However, based on the detection results of that subset and knowledge about the setup of the vision system of the mobile mapping vehicle 20, mask data can also be generated for every orthorectified image of all components for the vision system. The basic principle is that different components of the recording vision system, including the camera 22, are mounted differently on the mobile mapping vehicle 20. This means that, at time t, an object 34 on the road surface 24 can be seen at different positions in the multiple vertical images recorded by the different components of the vision system. This way, given the knowledge of the position and movement of an object 34 in motion on the road surface 24 for at least one component 22 of the vision system, it can be predicted where and if a moving object 34 on the road surface 24 will be visible in the images of the other components of the vision system, and mask data can also be generated for those components.

As an example, the subset of cameras 22 can be two side cameras (left/right) and masks are generated by differencing in orthorectified space only for those two cameras. Based on these results, masks can be created for the other cameras (for example, the front cameras and the back cameras) assuming the moving object 34 complies to the assumption that for every component of the visual system, if an object in motion is visible in the orthorectified image at time t1 and at time t2, it is expected to be visible too for all t, with t1<t<t2, and furthermore than an object becoming visible in one part of the orthorectified image at time t1 is expected to move out of visibility at time t2 in the opposite part of the image. Thus, an object 34 becoming visible on the right side camera 22 creates the masks for the right front camera so that this one is used. Because of perspective differences, the parts of the road 24 blocked in a side camera 22 are still visible in the front camera 22, so the image from the front camera can be used. Once the overtaking car becomes also visible in the left of the right side camera and the right part becomes unusable again, masks can be created for the front camera so that in this case that one is not used (because the obstacle 34 will be even more visible). Because the headings of each camera 22 and the headings of the cameras in the subset are known, and based only on that angle in the masks of the subset cameras, the masks are generated for the other cameras as well. It might be possible to generate masks for every camera explicitly, as long as the common parts between frames in orthorectified space are large enough. However, using only a well-chosen subset greatly increases the processing speed and only mildly reduces results. Thus, the more an obstacle's behavior complies to the assumptions stated above, the smaller the decrease in performance noted.

As stated above, masks can be interpreted as weight images. Black, i.e., grayscale value of 255, means lowest priority, whereas white means highest priority. The first two steps in mask creation process flow generate only black or white values. As suggested earlier, a third step can generate gray values less than 255, thereby giving different priorities to different cameras based on the masks of the subset cameras and the camera's angle.

By these methods, it is possible to optimize the generation of orthorectified tiles 36, 38 produced from vertical images so as to improve visibility of the road surface and road shoulders. Because the same spot on the surface of interest 24 may be visible from two different cameras 22 at the same time or a different time (or from the same camera 22 at different times), improved visibility can be accomplished using the concepts of this invention.

Figure 14:
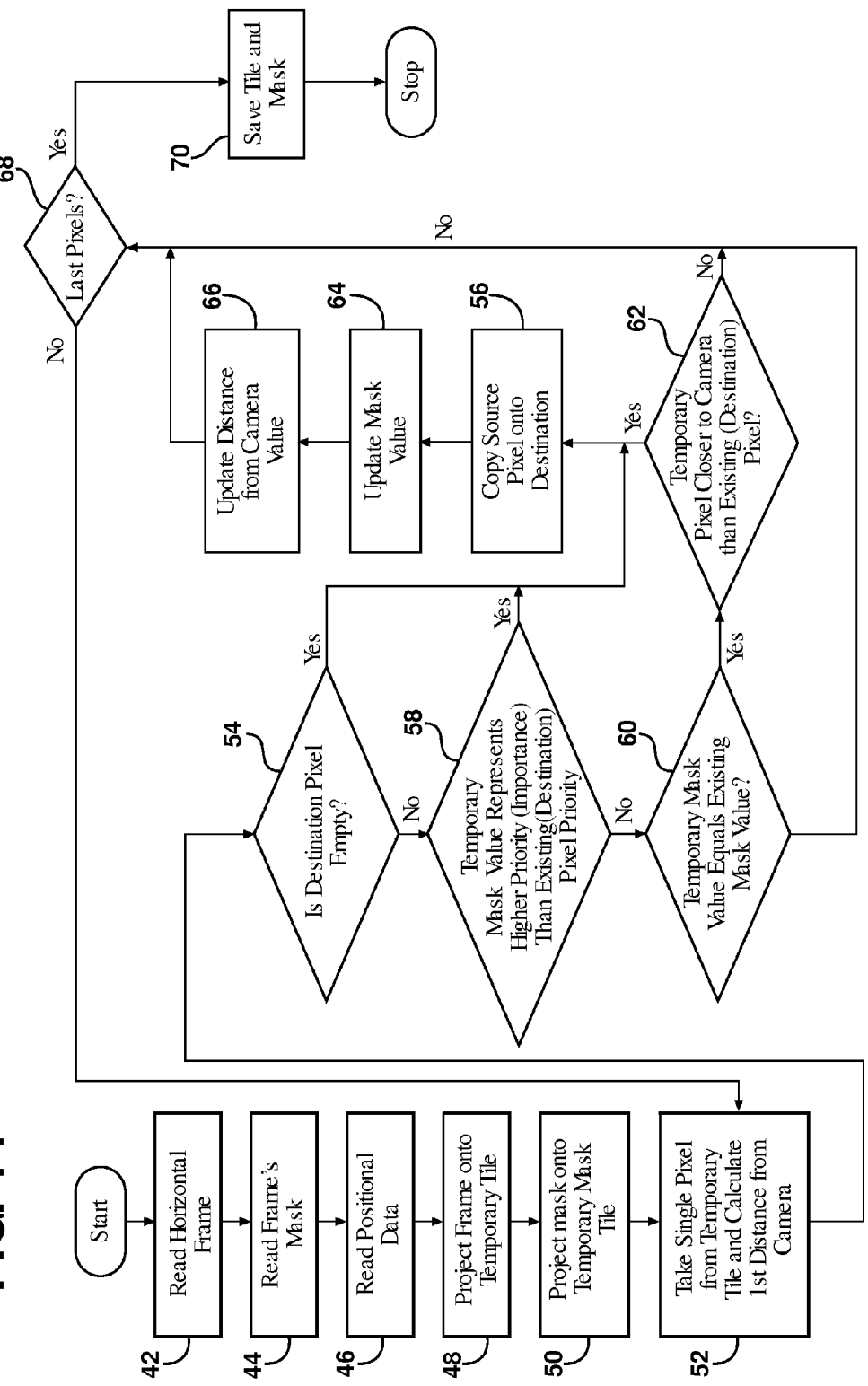
FIG. 14 is a flow diagram depicting a sequence of steps used to improve the visibility of the road surface in tiled, along the road orthorectified images using masks.

FIG. 14 illustrates another flow chart of this technique, wherein a first tile, provided from a first orthorectified photograph is read (step 42), together with a first mask for the first tile (step 44) which identifies any known moving foreground objects in the first tile. For purposes of discussion, it may be assumed that the first tile together with its first mask constitute an existing portion of a mosaic such as a BEM of the Earth's surface. A second tile, representing a new orthorectified photograph at least partly overlapping the first tile is provided, with its positional data read by the system in step 46. The second mask is projected onto a temporary tile as indicated at step 48. Likewise, the mask for the second frame is projected onto a temporary mask tile in step 50. The camera distance for the temporary file is calculated at step 52. This is the Euclidian distance measured from the focal point of the camera 22 to the pixel or region under consideration. Region-by-region, or perhaps pixel-by-pixel, the entire coincident sections 32 of the first and second tiles are compared. If the first, or destination, tile has an empty region or pixel, then the corresponding region or pixel from the second, temporary tile is used. This is shown in query 54 and step 56. If the grayscale value of the corresponding pixel or region in the second (i.e., temporary) mask is greater than the grayscale value of the corresponding pixel or region in the first mask, then that pixel or region in the first tile is replaced with the one from the second or temporary tile. This is shown in query 58 followed by step 56. If the grayscale values are equal, or within a predefined range, as suggested by query 60, then another query is made at 62 to determine whether the camera distance of the second, temporary pixel is less than that of the first, destination pixel. If the second, temporary pixel was taken from a closer distance, then the second, temporary pixel (or region) is copied to, i.e., replaces, the first pixel (or region) as per step 56. The mask value is then updated (step 64), as well as the camera distance in step 66. A query is made at 68 whether the last region or pixel in the coincident section has been considered. If not, process steps 52-66 are repeated. Once the last pixel (or region) from the coincident section has been analyzed in this manner, the updated tile together with the updated mask are saved in step 70 and become part of the mosaic (BEM).

Figure 15:
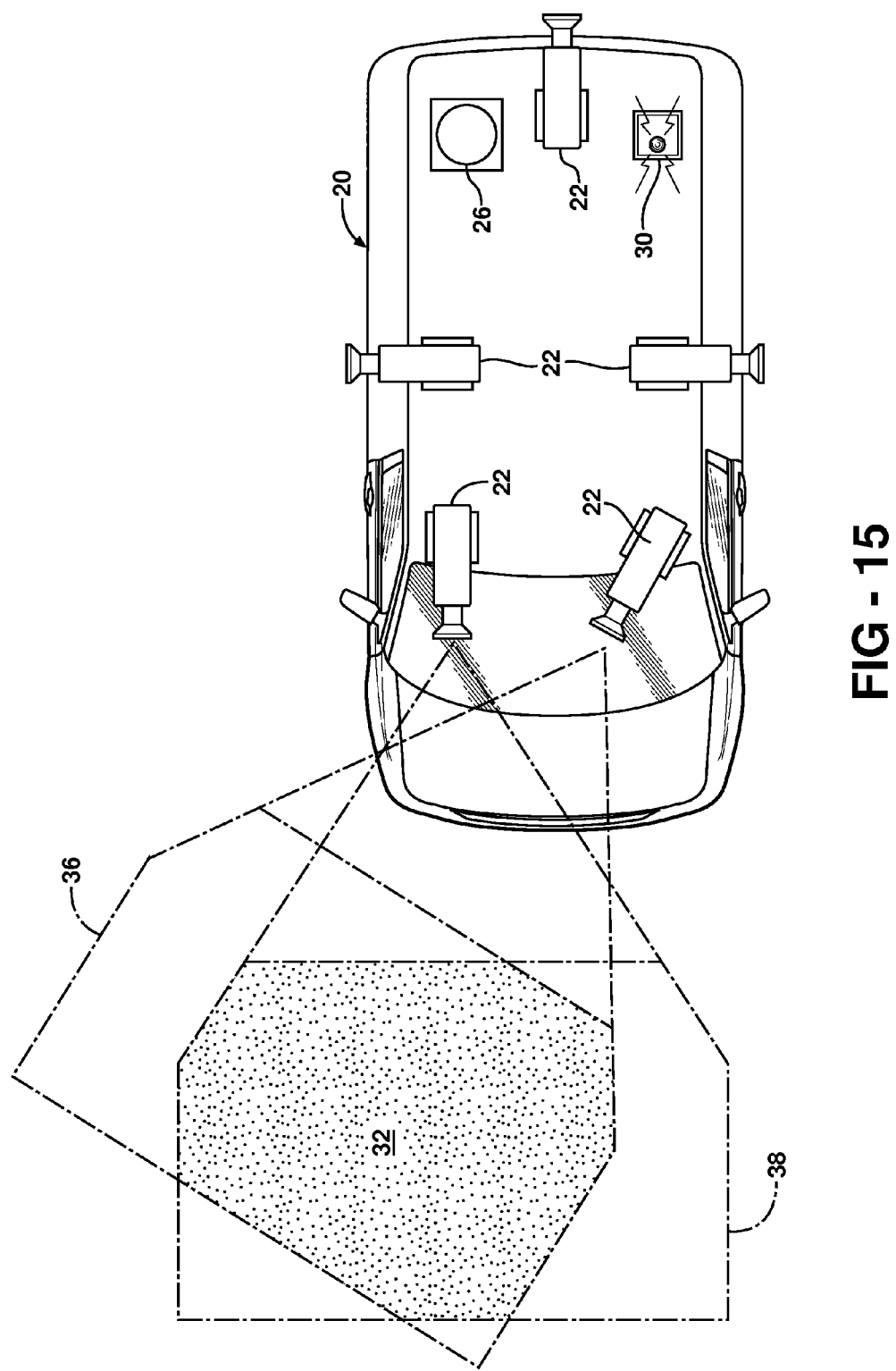
FIG. 15 is a simplified top view of a mobile mapping vehicle fitted with a plurality of cameras, two such cameras simultaneously photographing overlapping areas on the surface of interest.

By reference to FIGS. 15-18C, the diagram of FIG. 14 is graphically represented. In these examples, the first tile 38 is represented by a forward directed camera 22 and the second tile 36 originates from an angular camera 22. It must be understood, however, that the particular orientation of the cameras 22 shown in FIG. 15 is strictly for illustrative purposes only. An orthorectified first tile 38 is shown in FIG. 16A, whereas the orthorectified tile 36 is shown in FIG. 17A. A mask 40 created for the first tile 38 is shown in FIG. 16B, whereas a mask 72 for the second tile 36 is shown in FIG. 17B. In this simplified example, a moving object 34 is detected only in the second tile 36 (FIG. 17A), with its corresponding mask 72 reflecting the identified moving object 34 therein. Both tile and mask images are preferably stored in AVI files. As shown in FIG. 16B, there is nothing to mask in the tile 38 of FIG. 16A, because no moving objects have been detected in the horizontal image. As a consequence, the mask 40 is entirely white. The second tile 36 and its mask 72 are shown in FIGS. 17A and 17B. The tiles 36, 38 are then overlapped as shown in FIG. 18A without masks, such that a moving object 34 obscures part of the roadway image clearly seen in FIG. 16A when the second tile 36 overlies the first tile 38. The masks 40, 72 are then shown combined in FIG. 18B. If, by comparing the coincident, i.e., overlapping, sections 32 in the first 38 and second 36 tiles the grayscale value in the second mask 72 is greater than the grayscale value in the first mask 40, then the coincident section from the second tile 36 will be used to replace that of the first tile 38. However, in this particular example, the opposite is true in that the comparison of coincident sections corresponding in the two masks 40,72 shows that the grayscale value in the second mask 72 is less than the grayscale value of the corresponding section in the first mask 40. Therefore, the underlying portion in first tile 38 image is used, as represented by the resulting FIG. 18C.

FIG. 18C shows that some portion of the moving object 34 does appear in the resulting mosaic because the second tile 36 contained image data for which there was no corresponding section in the first tile 38. Thus, when there is no corresponding pixel or region in the first tile 38, the image data from the second tile 36 is used even if it contains a known moving object 34. In the case where the comparison of the coincident sections indicates that the grayscale value between the first and second masks is generally equal, then the system will assess the distance at which the respective first and second photographs were taken. Photographic distance here represents the distance between the images in the orthorectified tiles and the focal point of the camera 22. The image with the smallest photographic distance will be presumed to be more reliable, and therefore its image will be given priority in the overlapping section 32.

Once the overlapping is complete, the mosaic masks are updated, together with the photograph distances recorded in the mosaic so that in any subsequent tiling operation new orthorectified tiles will be compared against the recorded mask data. In this manner, orthorectified tiles are assembled into mosaics with overlapping sections being selected based on image content relating specifically to the presence of moving objects 34.

Thus, through the techniques of this invention, moving objects 34 are identified and then masks are created from orthorectified tiles which can be used to determine which sections of overlapping tiles should be given priority when creating a mosaic of a large surface of interest 24 such as the Earth. According to prior art techniques, indiscriminately overlaying orthorectified tiles can give results that are less useful because obstacles 34 can cover parts of the surface of interest 24. According to this invention however, the use of masks helps to select the best available images that have the most relevant information of horizontal objects such as lane dividers, lane corridors, drain placement, etc. Thus, the use of masks helps improve legibility of the resulting mosaic (BEM). And because these masks can be generated strictly on the basis of compared image data, no additional imagery or laser data technology is required to identify moving objects 34. Rather, only a pair of overlapping horizontal (orthorectified) images is needed for generating a bird's eye mosaic (BEM). Moving objects 34 are detected by grayscale differencing on common regions or pixels of multiple orthorectified tiles. Because the detection is done in orthorectified space, the process is straightforward to distinguish background from moving objects 34, as opposed to changing detection in a vertical frame context.

Figure 19:
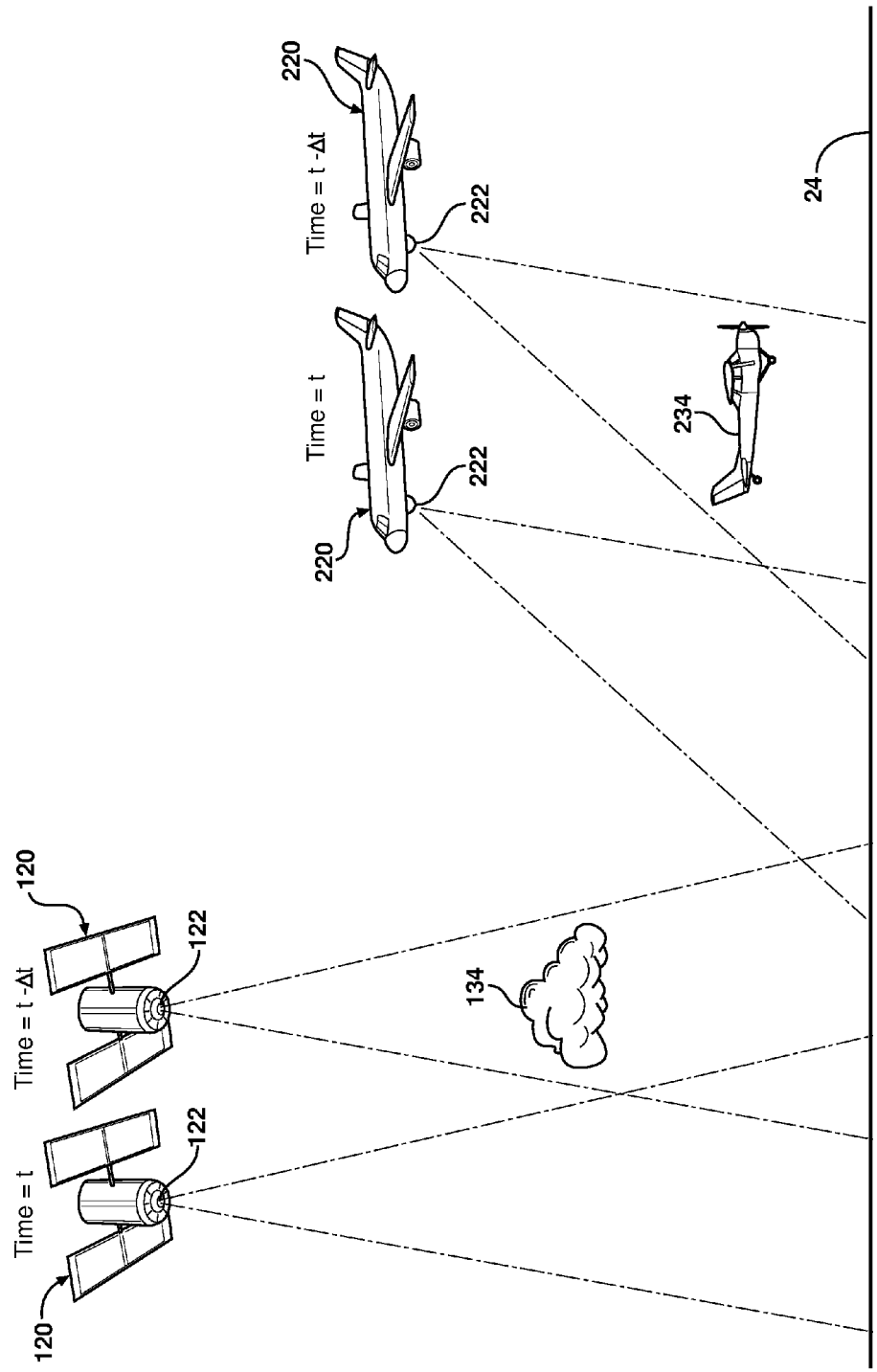
FIG. 19 is a highly simplified view illustrating the manner in which the concepts of this invention can be used for other image taking and mosaic applications, wherein the orthorectified tiles may originate from satellite images and/or aerial photographs.

FIG. 19 shows two alternative applications of this invention wherein the orthorectified tiles result from images taken from cameras 122, 222 carried on aerial vehicles such as satellites 120 or aeroplanes 220. In this instance also, moving foreground obstructions 134, 234 can create obstructions in the resulting images. Through direct application of the concepts described herein, it is possible to improve the image quality of a resulting mosaic from these aerial images.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method for creating a mosaic of a large surface of interest such as the earth from a plurality of small, overlapping photographic images, said method comprising the steps of:
   providing a first tile from a first orthorectified photograph of the surface of interest, the first photograph having been taken with a first camera at a first distance and at a first time, the first tile divided into discrete sections and associated with an absolute coordinate location and orientation relative to the surface of interest;
   providing a first mask for the first tile in which any known moving foreground objects are assigned low priority grayscale values and all other areas in the first tile are assigned a high priority grayscale value, the first mask being divided into discrete sections corresponding to the sections of the first tile;
   providing a second tile from a second orthorectified photograph of the surface of interest at least partly overlapping the first tile, the second photograph having been taken with a second camera at a second distance and at a second time, the second time being different from the first time, the second tile divided into discrete sections and associated with an absolute coordinate location and orientation relative to the surface of interest;
   predicting when any known moving foreground object in the first tile will be visible by the second camera;
   creating a second mask for the second tile in which any known moving foreground objects are assigned low priority grayscale values and all other areas in the second tile are assigned a high priority grayscale value, the second mask being divided into discrete sections corresponding to the sections of the second tile, wherein the second mask is generated based on the first mask, the prediction, and a disposition and heading of the first and second camera;
   comparing coincident sections in the first and second tiles; and
   replacing the coincident section in the first tile with the coincident section from the second tile if the grayscale value of the corresponding section in the second mask has a higher priority than the grayscale value of the corresponding section in the first mask.

2. The method of claim 1 further including the step of replacing the coincident section in the first tile with the coincident section from the second tile if there is no corresponding section in the first tile.

3. The method of claim 1 further including the step of replacing the coincident section in the first tile with the coincident section from the second tile if the grayscale value of the corresponding section of the second mask is equal to the grayscale value of the corresponding section of the first mask and the second photograph distance is smaller than the first photograph distance.

4. The method of claim 1 wherein said step of replacing the coincident section in the first tile with the coincident section from the second tile includes replacing the corresponding section in the first mask with the corresponding section in the second mask, and replacing the first photograph distance with the second photograph distance.

5. The method of claim 1 wherein said steps of providing the respective first and second tiles include mounting at least one camera on a mobile vehicle that moves relative to the surface of interest.

6. The method of claim 1 wherein said steps of associating the first and second tiles include imprinting coordinate data from a GPS satellite receiver on the respective first and second tiles.

* * * * *